C. E. EGNÉR.
SOLDERING BODY FOR JOINING ELECTRIC CONDUITS OR THE LIKE.
APPLICATION FILED MAY 11, 1911.

1,067,415.  Patented July 15, 1913.

Witnesses:
Eugene Wening
C. Camilla Franck

Inventor
Carl Emil Egnér
by
his Attorney

UNITED STATES PATENT OFFICE.

CARL EMIL EGNÉR, OF STOCKHOLM, SWEDEN.

SOLDERING-BODY FOR JOINING ELECTRIC CONDUITS OR THE LIKE.

1,067,415.  Specification of Letters Patent.  Patented July 15, 1913.

Application filed May 11, 1911. Serial No. 626,501.

*To all whom it may concern:*

Be it known that I, CARL EMIL EGNÉR, a subject of the King of Sweden, and resident of 63 Blekingegatan, Stockholm, in the Kingdom of Sweden, chief engineer, have invented certain new and useful Improvements in Soldering-Bodies for Joining Electric Conduits or the Like, of which the following is a specification, reference being made to the accompanying drawing.

The present invention relates to soldering bodies intended for joining electric conduits or the like. Soldering bodies made in accordance with this invention are characterized chiefly by the combination of a body consisting of soldering tin or the like and a body which consists of aluminium or another suitable material which cannot be soldered with tin or the like in the ordinary manner. The soldering body (or the bodies forming the same) can have any desirable shape. When using a soldering body made in accordance with this invention it is heated in a suitable way, for example by means of the flame of a match or the like, or by the combustion of a body combined with the soldering body, whereby the tin which is nearest to the metallic surfaces which are to be joined, melts and brings about the joining, while the aluminium body, which surrounds the tin, protects the same and the metallic surfaces to be joined from the gases produced by the combustion and also prevents the melted tin from flowing away, in addition to which the body in question, on account of the great thermal conductivity of aluminium, distributes the heat around the joint. The aluminium body can readily be removed after the soldering, and a perfectly safe joint with a neat appearance has been obtained.

The tin body can suitably serve as the carrier of a soldering agent which melts before the tin and acts in the required way. The soldering agent can, if desired, also serve to connect the tin body and the aluminium body with each other.

Several forms of the invention are illustrated in the accompanying drawing, wherein—

Figure 1 is a front elevational view of one form of the invention; Fig. 2 is an edge view thereof; Figs. 3, 4 and 5 are views illustrating the successive steps of applying the invention; Fig. 6 is a front elevational view, and Fig. 7 an edge view of a modified form of the invention, and Figs. 8, 9 and 10 are views illustrative of the successive steps of applying the invention; Fig. 11 is an end view of a further modified form of the invention and Fig. 12 is an elevational view of a still further modified form.

In the arrangement shown in Figs. 1 and 2, 1 is a thin plate of tin, in which a number of holes have been made, and 2 is a non-perforated plate of aluminium. The two plates are fastened together by resin dissolved in turpentine; the solution of resin ought to be so concentrated that it forms a sticky liquid. The resin can be replaced with another substance which is capable of being employed as a soldering flux.

Figs. 3 to 5 show how the arrangement is employed. The combined soldering body is bent in the way shown by Fig. 3 around the two wire ends 3 which are to be joined and is pressed together by means of the fingers, a pair of tongs or the like, so that the joint gets the appearance shown by Figs. 4 and 5. The flame of a match, or some other suitable source of heat, is placed under the soldering body, whereupon the resin first of all melts and flows in over the ends of the wires followed by the tin. The resin serves as a soldering agent so that the tin safely flows in. After the joint has cooled the aluminium plate 2, which is still loose, is removed, and the wire ends are soldered together.

The soldering body shown in Figs. 6 and 7 differs from the one just described only in that it is provided with a combustion body 4 and preferably also with an ignition body or a fulminate 5. The combustion body is secured to the aluminium plate by doubling the latter upon itself so as to form a flange shown in Fig. 7. This flange ought to be provided with holes or recesses into which the combustion mass enters when it is applied.

Figure 12:
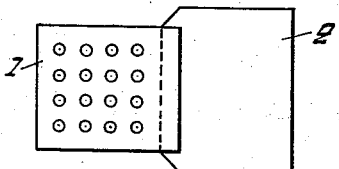

Fig. 12 shows another form of the soldering body. The tin plate 1 and the aluminium plate 2 are here not laid on each other, but are united at one of their edges so that together they form a strip. The tin plate is, preferably on both sides, covered with resin which fastens in the holes made in the plate. When being used the strip is wound around the ends of the wires in such a way that the tin plate comes inside the aluminium plate, after which the heating takes place as before. There is nothing to prevent a combustion body being used here, attached in some suitable way to the aluminium plate.

The chief advantages of the soldering bodies here described are, that they are very cheap to manufacture and convenient to use, and that every special size can be employed for several different dimensions of wire. The latter fact is possible because the soldering body is open sidewise and does not contain a tube or the like which must be adapted for certain wire dimensions. The ends of the wires can be put into the soldering body either located side by side or after they have been twisted together. There is nothing to prevent them from first being put into a tube or into a wire spiral, whereafter they are surrounded with the soldering body in order to be soldered to the tube or the spiral.

The soldering body can have another shape than the one given; it can, for example, have the shape of a tube or a sleeve. The tin body then forms a tube or a sleeve which is surrounded by the aluminium body which has a corresponding shape.

The arrangements described can be varied in many ways without departing from the fundamental idea of the invention. Thus, for example, the perforations in the tin plate are not necessary, as this plate can be covered on the outer side with resin or some other soldering agent. Further, the tin plate can be fastened to the aluminium plate in some other way than by sticking them together, or the plates can be separated, and then the first plate and thereupon the second one can be laid on. Instead of having a tin plate the aluminium plate can be covered with a mixture of pulverized tin solder and some soldering agent, e. g. resin dissolved in turpentine, or in the very process of soldering a suitable quantity of such a mixture can be applied to the aluminium plate before this is squeezed fast around the ends of the wires.

Figure 1:
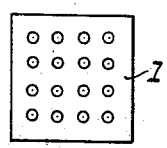
Figure 2:
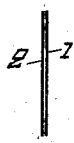
Figure 3:
Figure 4:
Figure 5:
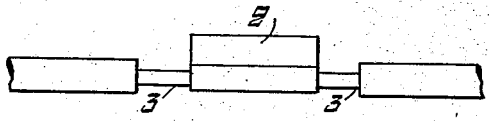
Figure 6:
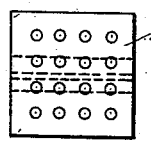
Figure 7:
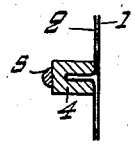
Figure 8:
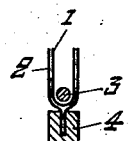
Figs. 8, 9 and 10 show how this soldering body is applied around the ends of the wires. The fulminate of the combustion body is ignited against a suitable surface, and thereupon the combustion body supplies the heat necessary for the soldering.
Figure 9:
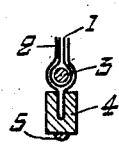
Figure 10:
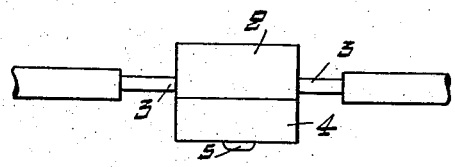
Figure 11:
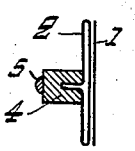
Fig. 11 shows a somewhat different form of the soldering body from that shown in Figs. 6 and 7. Here the aluminium plate is bent double, and its two ends are brought together so as to form the flange necessary for the fastening of the combustion mass.

When being manufactured the soldering plate can be bent so as to form an open chute (in accordance with Fig. 3), etc. The chief things are that the soldering body can be put on wire ends which have previously been twisted together or in some other way connected to each other and also that every special soldering body can be employed for different dimensions of wires and, finally, that it is provided with a protection of aluminium or the like.

Having now described my invention, what I claim as new and desire to secure by Letters Patent is:

1. As a new article of manufacture, a soldering medium comprising a flexible body of solder, and a continuous flexible metallic body rigidly yet removably attached to said body of solder, said metallic body having a higher fusing point than said solder and being substantially non-adhesive with respect to the latter when said solder is fused whereby said metallic body may be removed in substantially intact condition after a soldering operation.

2. As a new article of manufacture, a soldering medium comprising a flexible body of solder having a continuous flexible body of aluminium rigidly yet removably attached thereto.

In witness whereof I have hereunto set my hand in presence of two witnesses.

CARL EMIL EGNÉR.

Witnesses:
 HANS B. OHLSSON,
 CARL TH. LUNDHOLM.